Patented Aug. 4, 1953

2,647,928

UNITED STATES PATENT OFFICE 2,647,928

STABILIZED COMPOSITIONS OF HYDROXY-PHENYLAMMONIUM HALIDES

Arthur Stempel, River Edge, N. J., assignor to Hoffmann-La Roche Inc., Nutley, N. J., a corporation of New Jersey No Drawing. Application June 28, 1951, Serial No. 234,149

4 Claims. (Cl. 260—567.6)

This invention relates to the stabilization of (3-hydroxyphenyl) ethyl dimethylammonium halides, such as the chloride, bromide and iodide. These compounds, per se, are useful as anticurare agents. Aqueous solutions of these materials, originally colorless, were found to become pink in color when permitted to stand at room temperature or when sterilized by heating. Solutions in this condition are unsatisfactory for therapeutic use.

It has now been found that solutions containing (3-hydroxyphenyl) ethyl dimethylammonium halides can be stabilized against discoloration by adding thereto relatively small inhibiting amounts of an alkali metal sulfite, for example, sodium sulfite. When inhibiting or stabilizing amounts of sodium sulfite are added to solutions of the (3-hydroxyphenyl) ethyl dimethylammonium halides, the solution can be sterilized at elevated temperatures and subsequently stored indefinitely without undergoing change in color. The amount of the stabilizing agent to be added to the solutions may be varied. Any effective amount for this purpose may be employed. Thus, for example, the addition of 0.1 per cent of the sulfite has generally been found effective for preventing the discoloration of solutions containing 1 per cent of the (3-hydroxyphenyl) ethyl dimethylammonium halides. In general, higher or lower inhibiting concentrations, if desired, may be employed, depending on the concentration of the quaternary ammonium salts in the solutions. Where desired, buffers and antiseptics also may be included in the stabilized solutions.

The (3-hydroxyphenyl) ethyl dimethylammonium halides are new compounds and their preparation is illustrated by the following examples. The compounds are disclosed and claimed in the copending application of John Alfred Aeschlimann and Arthur Stempel, Serial No. 152,998, filed March 30, 1950.

EXAMPLE A

*(3-hydroxyphenyl) ethyl dimethylammonium bromide*

To a solution of 100 grams of m-dimethylaminophenol in 1,100 cc. of acetone were added 150 grams of ethyl bromide. The solution was heated in a nitrogen atmosphere in a closed vessel for ten hours at 80° C. An oily product separated which soon crystallized. It was filtered off and recrystallized from a mixture of ethanol and ether, yielding (3-hydroxyphenyl)- ethyl dimethylammonium bromide; M. P. 151–152° C. (with decomposition).

EXAMPLE B

*(3-hydroxyphenyl) ethyl dimethylammonium iodide*

A solution made up of 10 grams of m-dimethylaminophenol, 50 cc. of acetone and 13 grams of ethyl iodide was heated at 50° C. for five hours. On addition of ether to the cooled solution, (3-hydroxyphenyl) ethyl dimethylammonium iodide precipitated as an oil which soon crystallized. Upon recrystallization from isopropanol, the compound had a M. P. of 113–115° C.

EXAMPLE C

*(3-hydroxyphenyl) ethyl dimethylammonium chloride*

A slight excess of a 10% sodium hydroxide solution was added to a solution of 23 grams of silver nitrate in 300 cc. of water. The precipitated silver oxide was washed free of silver ion with distilled water. To a suspension of the silver oxide in 200 cc. of water, a solution of 25 grams of (3-hydroxyphenyl) ethyl dimethylammonium iodide in 300 cc. of water was added. The precipitate of silver iodide was removed by filtration and the filtrate concentrated to a volume of about 100 cc. in vacuo. The remainder of the water was removed by lyophilization. (3-hydroxylphenyl) ethyl dimethyl-ammonium hydroxide was obtained as a hygroscopic, amorphous solid. A solution of 5 grams of (3-hydroxyphenyl) ethyl dimethylammonium hydroxide in about 200 cc. of water was neutralized with dilute hydrochloric acid. On concentration to dryness in vacuo, (3-hydroxyphenyl) ethyl dimethylammonium chloride crystallized. The compound was recrystallized from isopropanol; M. P. 162–163° C. (with decomposition).

The following examples will serve to illustrate the preparation of stable solutions of (3-hydroxyphenyl) ethyl dimethylammonium halides.

EXAMPLE 1

1 gram of (3-hydroxyphenyl) ethyl dimethylammonium chloride and 0.1 gram of sodium sulfite were dissolved in 100 cc. of distilled water. The resulting solution was filtered and sealed in 5 cc. ampules. The ampules were sterilized by autoclaving for 1 hour at 120° C. No discoloration of the solution occurred. On the other hand, in ampules of a similar solution from which the sodium sulfite was omitted a pink color developed.

EXAMPLE 2

13.2 grams of sodium citrate and 3.54 grams of anhydrous citric acid (buffers) were dissolved in 950 cc. of distilled water. To the resulting solution were added 2 grams of sodium sulfite, 10 grams of (3-hydroxyphenyl)ethyl dimethylammonium chloride, and anhydrous citric acid to a pH of 5.5. The solution was then diluted with distilled water to a volume of 1,000 cc. It was filtered and ampuled in 1 cc. ampules. The ampules were sterilized with steam at 10 pounds pressure for 30 minutes. The ampuled solution remained clear and colorless.

EXAMPLE 3

5 grams of phenol (antiseptic) was dissolved in 950 cc. of distilled water, and to the resulting solution were added 2 grams of sodium sulfite, 13.2 grams of sodium citrate, 2.57 grams of anhydrous citric acid, and 10 grams of (3-hydroxyphenyl)ethyl dimethylammonium chloride. The solution was adjusted to a pH of 5.5 with citric acid and then diluted with distilled water to a volume of 1,000 cc. It was filtered, sealed in 10 cc. of glass vials, and sterilized with steam at 10 pounds pressure. The solution remained clear and colorless.

EXAMPLE 4

1 gram of (3-hydroxyphenyl)ethyl dimethylammonium bromide and 0.1 gram of sodium sulfite were dissolved in 100 cc. of distilled water. The resulting solution was filtered and sealed in 5 cc. ampules. The ampules were sterilized by autoclaving for 1 hour at 120° C. The solution remained clear and colorless.

I claim:

1. An aqueous solution of (3-hydroxyphenyl)-ethyl dimethylammonium halide stabilized against color formation by means of an alkali metal sulfite.

2. A solution according to claim 1 in which the stabilizing agent is sodium sulfite.

3. A solution according to claim 1 in which the stabilizing agent is sodium sulfite and the halide is chloride.

4. A solution according to claim 1 in which the stabilizing agent is sodium sulfite and the halide is bromide.

ARTHUR STEMPEL.

References Cited in the file of this patent

UNITED STATES PATENTS

| Number | Name | Date |
|---|---|---|
| 2,130,322 | Kharasch | Sept. 13, 1938 |
| 2,208,485 | Aeschlimann | July 16, 1940 |

OTHER REFERENCES

Haworth "J. Chem. Soc." (London), 1947, pp. 182 to 191.